United States Patent [19]

Lew et al.

[11] Patent Number: 5,663,509

[45] Date of Patent: *Sep. 2, 1997

[54] INERTIA FORCE FLOWMETER

[76] Inventors: Hyok S. Lew; Yon S. Lew, both of 7890 Oak St., Arvada, Colo. 80005

[*] Notice: The term of this patent shall not extend beyond the expiration date of Pat. No. 5,602,344.

[21] Appl. No.: 523,811

[22] Filed: Sep. 5, 1995

Related U.S. Application Data

[63] Continuation-in-part of Ser. No. 299,362, Sep. 1, 1994.
[51] Int. Cl.$^6$ .................................................... G01F 1/84
[52] U.S. Cl. ...................... 73/861.357; 73/861.355; 73/861.356
[58] Field of Search .................... 73/861.355, 861.356, 73/861.357

[56] References Cited

U.S. PATENT DOCUMENTS

| | | | |
|---|---|---|---|
| 5,226,330 | 7/1993 | Lew | 73/861.37 |
| 5,337,616 | 8/1994 | Lew | 73/861.356 |
| 5,359,901 | 11/1994 | Lew et al. | 73/861.38 |
| 5,425,277 | 6/1995 | Lew | 73/861.357 |
| 5,501,106 | 3/1996 | Lew et al. | 73/861.356 |

*Primary Examiner*—Richard Chilcot
*Assistant Examiner*—Jewel V. Artis

[57] ABSTRACT

An inertia force flowmeter comprises at least one conduit (1), an electromagnetic vibrator (11) generating a transverse reciprocating motion of the conduit (1) and a pair of differential pressure sensors (12 and 13) detecting the fluid pressure gradient in directions parallel to the directions of the transverse reciprocating motion of the conduit (1) respectively at two different sections of the conduit (1), wherein the mass flow rate is determined as a function of phase difference between two alternating electrical signals respectively provided by the two differential pressure sensors (12 and 13).

20 Claims, 4 Drawing Sheets

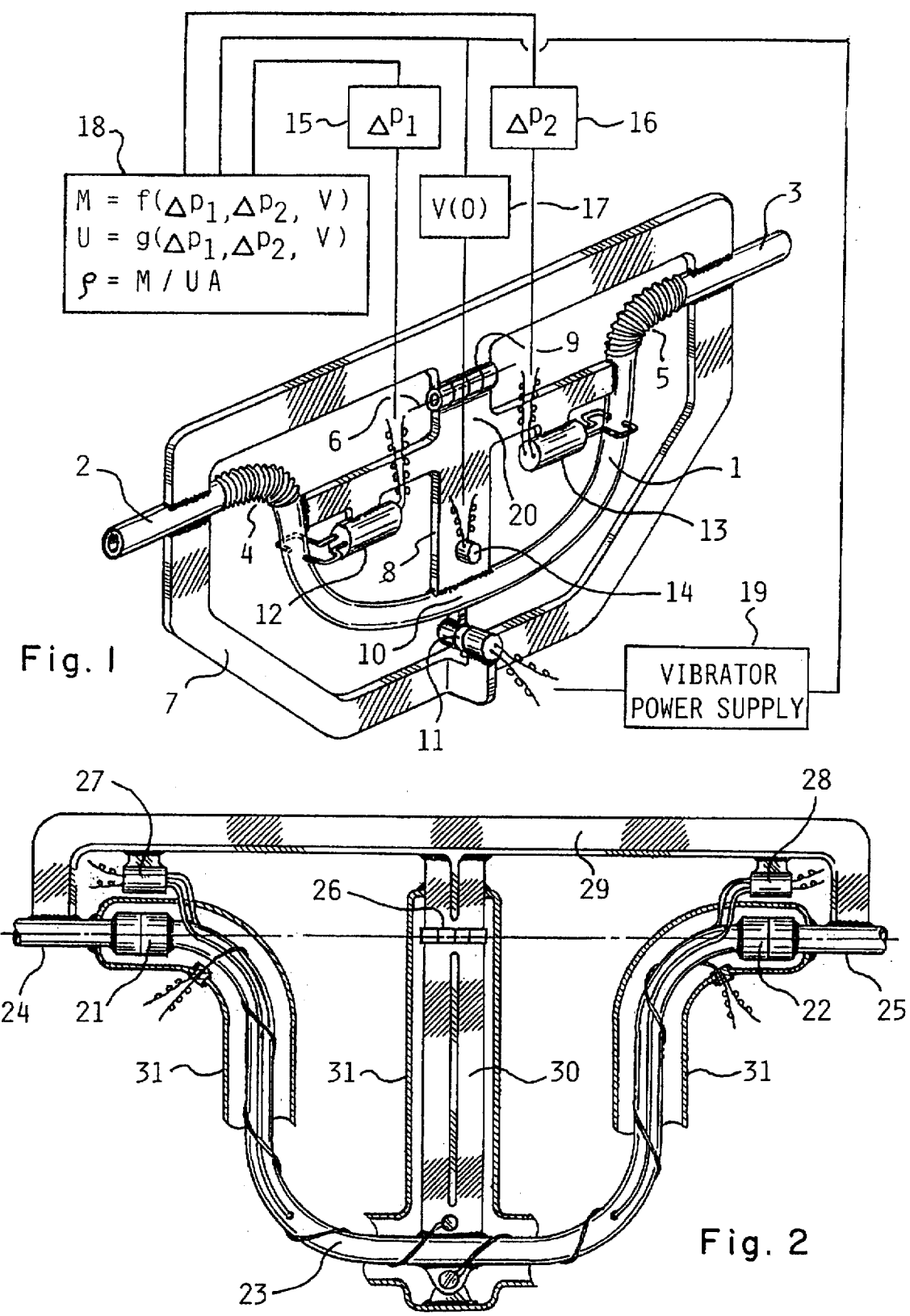

INERTIA FORCE FLOWMETER

This patent application is a continuation-in-part application to patent application Ser. No. 08/299,362 entitled "Inertia Force Flowmeter" filed on Sep. 1, 1994.

FIELD OF THE INVENTION

This invention relates to a flowmeter comprising a conduit under a reciprocating motion in directions perpendicular to the direction of fluid flow through the conduit, a pair of differential pressure sensors respectively detecting two fluctuating differential pressures resulting from the reciprocating motion of the fluid and the convective motion of the fluid at two different sections of the conduit, and a velocity sensor measuring the oscillatory velocity of the reciprocating motion of the conduit at the center section of the conduit, wherein the mass flow rate of fluid moving through the conduit is determined as a product of a function of a phase difference between two alternating electrical signals respectively generated by the pair of differential pressure sensors and a ratio of the mean value of the amplitudes of the two alternating electrical signals generated by the pair of differential pressure sensors to the amplitude of a third alternating electrical signal generated by the velocity sensor, and the volume flow rate of the fluid is determined as a product of a function of the phase difference between the two alternating electrical signals generated by the pair of differential pressure sensors and the amplitude of the third alternating electrical signal generated by the velocity sensor.

BACKGROUND OF THE INVENTION

Without any exceptions, all of the existing versions of the Coriolis force mass flowmeter on the convective inertia force flowmeter employ a combination of one or a pair of cunduits under a flexural vibration and two vibration sensors respectively detecting the flexural vibration of the conduit at two sections of the conduit, wherein the mass flow rate of fluid moving through the conduit is determined as a product of an empirically determined constant and a function of a phase difference between two alternating electrical signals respectively generated by the two vibration sensors. It can be readily shown by carrying out a reasonably simple mathematical analysis of the flexural vibration of a conduit containing fluid moving there-through that the above-mentioned empirically determined constant is not a constant in actuality and varies as a function of several dynamic variables such as the amplitude and frequency of the flexural vibration of the conduit, density of the fluid media, stiffness of the conduit, etc. As the existing versions of the Coriolis force or inertia force mass flowmeter operate on principles less than fully rigorous and accurate, these mass flowmeters lack the self-calibrating ability and, consequently, these mass flowmeters must be recalibrated time to time in order to eliminate the error in the mass flow measurement arising from the change in the dynamic variable characterizing the flexural vibration of the conduit containing the moving fluid therethrough.

Another short-coming of the existing versions of the Coriolis force or inertia force mass flowmeter is their vulnerability to ambient mechanical vibrations and their inability to measure the mass flow rate of media having low values of density such as gaseous media, which short-coming results from the fact that the existing versions of the Coriolis force or convective inertia force mass flowmeter measures the flexural vibration of the conduit at two different sections thereof and measures a phase difference between the two flexural vibrations of the conduit respectively measured at the two different sections of the conduit. It is readily realized that the phase difference between the two flexural vibration of the conduit respectively occurring at the two different sections of the conduit is a result of the phase difference between two transverse pressure gradients respectively existing at the two different sections of the conduit and, consequently, it is greatly more advantageous to measure the two transverse pressure gradients respectively existing at the two different sections of the conduit rather than measuring the flexural vibration of the conduit at the two different sections of the conduit, and determine the mass flow rate of fluid as a function of the phase difference between the two transverse pressure gradients instead of the phase difference between the two flexural vibrations. The present invention teaches a new method and structural embodiments for measuring directly the convective inertia force experienced by the fluid media moving through the conduit, wherein transverse pressure gradient existing in the fluid media is detected at two different sections of the conduit and the mass flow of the fluid media is determined as a function of a phase difference between the two transverse pressure gradients. As the inertia force flowmeter of the present invention detecting the transverse pressure gradients at two different sections of the conduit and obtaining the phase difference between the two transverse pressure gradients as a measure of mass flow rate of fluid media measures the convective inertia force experienced by the fluid media directly instead of measuring an effect of the convective inertia force in the form of the resulting flexible vibration of the conduit, the present invention provides a new inertia force mass flowmeter calibrating itself on a real time basis and capable of measuring mass flow rate of liquid media as well as gaseous media, which new inertia force mass flowmeter can be constructed in all different sizes varing from a very small size to a very large size, and can be made of a rigid curved pipe or pipes with thick wall.

BRIEF SUMMARY OF INVENTION

The primary object of the present invention is to provide an inertia force flowmeter comprising at least one rigid or elastic conduit under a reciprocating motion in directions perpendicular to the direction of fluid flow through the conduit; and a plurality of measuring devices detecting the convective inertia force experienced by the fluid at two different sections of the conduit directly, and measuring the amplitude of the fluctuation in the fluid pressure resulting from the reciprocating motion of the conduit and/or the amplitude of oscillatory velocity of the reciprocating motion of the conduit, wherein the mass flow rate of fluid moving through the conduit is determined from a mathematical combination of the phase angle difference between two alternating convective inertia forces experienced by the fluid at the two different sections of the conduit, and the amplitude of the fluid pressure fluctuation and/or the amplitude of the oscillatory velocity of the reciprocating motion of the conduit.

Another object is to provide the inertia force flowmeter described in the afore-mentioned primary object of the invention, wherein the devices detecting the convective inertia force at two different sections of the conduit comprise one or a pair of differential pressure sensors detecting the transverse pressure gradient in directions perpendicular to the direction of the fluid flow.

A further object is to provide the inertia force flowmeter described in the primary object of the invention, wherein the devices measuring the convective inertia force at two different sections of the conduit comprises two vibration sensors respectively generating two alternating electrical signals representing the transverse reciprocating motion of the conduit respectively occurring at the two different sections of the conduit.

Yet another object is to provide the inertia force flowmeter described in the primary object of the invention, wherein the transverse reciprocating motion of the conduit is created by an electromagnetic vibrator.

Yet a further object is to provide the inertia force flowmeter described in the primary object of the invention, wherein the transverse reciprocating motion of the conduit is created by a rotating machine equipped with a crank shaft and a connecting rod, or a cam mechanism converting the rotary motion to a rectilinear reciprocating motion.

Still another object of the invention is to provide an inertia force volume flowmeter having the conduit of the construction employed in the afore-mentioned primary object of the present invention, and comprising a plurality of detecting devices detecting the convective inertia force experienced by the fluid at two different sections of the flow passage and measuring the amplitude of the oscillatory velocity of the transverse reciprocating motion of the conduit, wherein the volume flow rate of the fluid is determined from a mathematical combination of the phase angle difference between two alternating convective inertia forces experimented by the fluid respectively at the two different cross sections of the conduit or flow passage and value of the amplitude of the oscillating velocity of the reciprocating motion of the conduit.

These and other objects of the present invention will become clear as the description of the invention progresses.

BRIEF DESCRIPTION OF FIGURES

The present invention may be described with a greater clarity and specificity by referring to the following figures:

FIG. 1 illustrates an embodiment of the inertia force flowmeter of the present invention comprising a single curved conduit.

FIG. 2 illustrates another embodiment of the inertia force flowmeter of the present invention comprising a single curved conduit.

DESCRIPTION OF OPERATING PRINCIPLES

Figure 3:
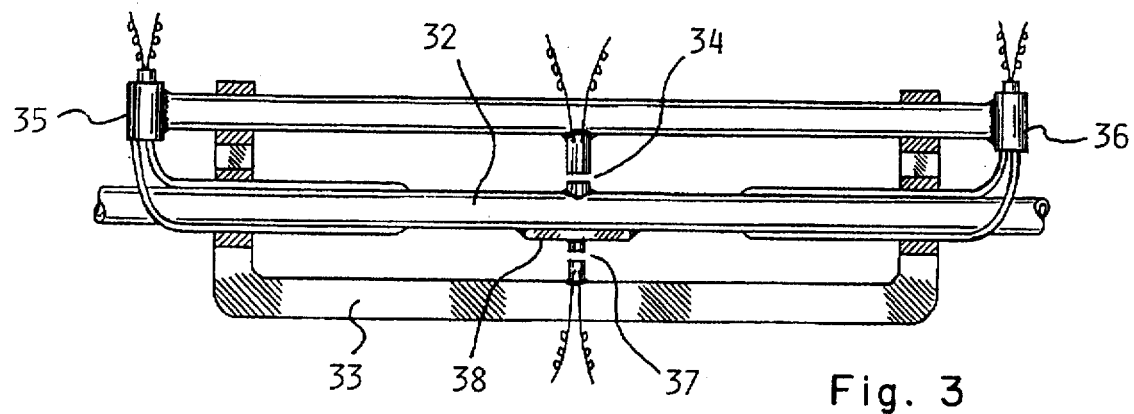
FIG. 3 illustrates yet another embodiment of the inertia force flowmeter of the present invention comprising a single straight conduit.

It can be shown by carrying out a reasonably uncomplicated mathematical analysis of solving the equation of motion of the conduit under a transverse reciprocating motion or a flexural vibration and the equation of motion of fluid moving through the conduit simultaneously, that the mass flow rate M of fluid moving through the conduit is related to the phase angle difference $\Delta\phi$ between two transverse pressure gradients existing in the fluid respectively at two different sections of the conduit located symmetrically about the midsection of the conduit by the following equation:

$$M = \frac{\omega^2 \rho L A V}{2V(0)\frac{dV}{dx}} \tan\left(\frac{\Delta\phi}{2}\right), \quad (1)$$

where $\omega$ is the circular frequency of the transverse reciprocating motion or flexural vibration of the conduit, $\rho$ is the density of fluid, L is the length of the conduit between the two opposite fixed ends of the conduit, A is the cross sectional area of the flow passage provided by the conduit, V is the amplitude of the oscillatory velocity of the transverse reciprocating motion or flexural vibration of the conduit occurring at either one of the two sections of the conduit, V(0) is the amplitude of the oscillatory velocity of the transverse reciprocating or flexural vibration-of the conduit occurring at the midsection of the conduit, and x is the distance measured from the midsection of the conduit following the center line of the conduit. The mathematical analysis is yielding the afore-presented equation (1) also provides the following relationship:

$$\Delta P = \frac{4\omega\rho A V}{\pi D}, \quad (2)$$

where $\Delta P$ is the amplitude of the fluctuation in the differential pressure across the diameter D of the cross section of the flow passage occurring at either of the two sections of the conduit in directions parallel to the direction of the reciprocating motion or flexural vibration of the conduit. When equation (2) is solved for and the the resulting relationship is substituted into equation (1) in order to eliminate V appearing in equation (1), the following equation is obtained:

$$M = \frac{\pi\omega D L \Delta P}{8V(0)\frac{dV}{dx}} \tan\left(\frac{\Delta\phi}{2}\right). \quad (3)$$

Since V(0) and V are proportional to one another, equation (3) can be written in the following forms:

$$M = K_1 \frac{\omega \Delta P}{V^2} \tan\left(\frac{\Delta\phi}{2}\right), \quad (4)$$

$$M = K_2 \frac{\omega \Delta P}{[V(0)]^2} \tan\left(\frac{\Delta\phi}{2}\right). \quad (5)$$

where $K_1$ $K_2$ are constants intrinsic to the geometrical structure and the material making up the conduit, which constants are empirically determined by calibrating the inertia force flowmeter. In equations (4) and (5), the amplitude of fluctuation $\Delta P$ of the differential pressure occurring in the directions of the reciprocating motion or flexural vibration of the conduit may be measured at either one of the two sections of the conduit or at the midsection of the conduit as these two measured values are proportional to one another. When the amplitude of the oscillatory velocity of the reciprocating motion or flexural vibration of the conduit is maintained at a constant value, equations (4) and (5) can be written in the form $$M = K_3 \omega \Delta P \tan\left(\frac{\Delta\phi}{2}\right). \tag{6}$$

If the frequency of the reciprocating motion or flexural vibration of the conduit is maintained at a constant value, equation (6) can be written in the form $$M = K_4 \Delta P \tan\left(\frac{\Delta\phi}{2}\right). \tag{7}$$

When the fluid media has a constant density, equation (8) takes a a further simplified form $$M = K_5 \tan\left(\frac{\Delta\phi}{2}\right). \tag{8}$$

In equations (6), (7) and (8), the constants of proportionality $K_3$, $K_4$ and $K_5$ are determined empirically by calibrating the inertia force flowmeter. The mass flow rate of fluid media moving through the conduit under the transverse reciprocating motion or flexural vibration is determined by using one of the above-listed equations (1), (3), (4), (5), (6), (7) and (8) in exact or approximate manner in the present invention. When the phase angle difference $\Delta\phi$ has values less than five degrees or so, the tangent value thereof can be approximated by the value of the phase angle difference in radians.

Since the mass flow rate of fluid is equal to the volume flow rate of fluid times the density of fluid, equation (18) can be written in the following form:

$$U = \frac{\omega^2 LV}{2V(0)\frac{dV}{dx}} \tan\left(\frac{\Delta\phi}{2}\right), \tag{9}$$

where U is the velocity of the fluid, which can be determined from equation (9) or one of the following equivalent versions of equation (9):

$$U = C_1 \frac{\omega^2}{V} \tan\left(\frac{\Delta\phi}{2}\right), \tag{10}$$

$$U = C_2 \frac{\omega^2}{[V(0)]} \tan\left(\frac{\Delta\phi}{2}\right), \tag{11}$$

or $$U = C_3 \tan\left(\frac{\Delta\phi}{2}\right), \tag{12}$$

where $C_1$, $C_2$ and $C_3$ are empirically determined constants of proportionality, of which numerical values are obtained by calibrating the inertia force flowmeter.

The phase angle difference $\Delta\phi$ appearing in equations (1), and (3) through (12) can be most accurately and economically obtained from two alternating electrical signals respectively generated by a pair of differential pressure sensors detecting the fluid pressure gradient in directions parallel to the direction of the transverse reciprocating motion or flexural vibration of the conduit or by a pair of vibration sensors detecting the transverse reciprocating motion or flexural vibration of the conduit, which pair of detecting devices are located symmetrically about a plane intersecting perpendicularly with the midsection of the conduit, by using one of the better known methods which are described as follows: One of the most familiar method is to measure the time interval $\Delta T$ between the consecutive zero-crossings of the two alternating electrical signal, measure the period T of either one of the two alternating electrical signals, and determine. the phase angle difference by using equation $$\Delta\phi = 2\pi \frac{\Delta T}{T}. \tag{13}$$

Another method is to measure a first and second values of one of the two alternating electrical signals respectively at two different instants when the other of the two alternating electrical signals reaches a zero value and a peak value, respectively, and determine the phase angle difference by using equation $$\tan(\Delta\phi) = \frac{E_1(t)|E_2(t) = 0}{E_1(t)|E_2(t) = \text{peak}}, \tag{14}$$

where $E_1(t)$ and $E_2(t)$ are the two alternating electrical signals. A further method is to obtain the two alternating electrical signals having the same amplitude or the normalized form of the two alternating electrical signals, and form the differential and additive combination of the two alternating electrical signals obtained in the particular form. The phase angle difference is determined by using equation $$\tan\left(\frac{\Delta\phi}{2}\right) = \frac{AMP \cdot [e_1(t) - e_2(t)]}{AMP \cdot [e_1(t) + e_2(t)]}, \tag{15}$$

where $e_1(t)$ and $e_2(t)$ are the two alternating electrical signals obtained in the above-mentioned particular form.

When the conduit is significantly rigid as in the case of the embodiments shown in FIGS. 1 and 2 of the patent drawings, it is preferred to generate the two alternating electrical signals by using a pair of differential pressure sensors respectively located on the two opposite sides of the center plane perpendicularly intersecting with center section of the conduit, and determine the phase angle difference by using one of equations (13), (14), and (15). When the conduit has low stiffness such as in the case of a tubing with thin wall, which can be the case of any one of illustrated embodiments shown in the patent drawings, the two alternating electrical signals may be generated by the above-mentioned pair of differential pressure sensors or by a pair of absolute or relative motion sensors respectively detecting the transverse reciprocating motion of flexural vibration of the conduit at two different sections of the conduit located symmetrically about the center plane, which two alternating electrical signals provide the phase angle difference therebetween by means of one of equations (13), (14) and (15).

It becomes immediately clear from the above-presented operating principles of the present invention that, firstly, the present invention teaches much more precise formula relating the phase angle difference between two alternating electrical signals generated by a pair of differential pressure sensors or by a pair of motion sensors to the mass flow rate of fluid moving through the conduit under a transverse reciprocating motion or flexural vibration, which formula determines the mass flow rate of fluid not only very accurately but also in a self-calibrating manner on a real time basis, and secondly, the use of the pair of differential pressure sensors in place of the pair of motion sensors provides two alternating electrical signals much more sensitively and accurately representing the convective inertia force experienced by fluid respectively at two different sections of the conduit compared with the conventional practice employing the pair of motion sensors and, consequently, the present invention provides a new method for measuring the mass flow rate and a new generation inertia force mass flowmeter that can employ a rigid or elastic conduit and is capable of measuring the mass flow rate of fluid having very low densities exhibiting very small inertia forces generally insufficient to produce a detectable secondary flexural vibration of the conduit. The inertia force flowmeter of the present invention is also perfectly suited for the construction of mass flowmeters of all sizes varying from a very small size to a very large size.

DESCRIPTION OF ILLUSTRATED EMBODIMENTS

In FIG. 1, there is illustrated a perspective view of an embodiment of the inertia force flowmeter comprising a single curved conduit, that is constructed and operating in accordance with the principles of the present invention. A curved conduit 1 having a geometry of a bow has an inlet leg 2 and an outlet leg 3 connected thereto respectively by two couplings 4 and 5, which couplings such as flexible couplings, pivoting or rotary couplings facilitate a pivotal vibration of the conduit 1 about a pivot axis 6. When the couplings 4 and 5 are flexible couplings, the bowed or curved conduit 1 should be supported by a supporting structure 7 in a relationship allowing a pivotal movement of the bowed or curved conduit 1 about the pivot axis 6 parallel to the common center line of the inlet and outlet legs 2 and 3 as exemplified by the particular illustrative embodiment, wherein the conduit 1 is rigidly secured to a reinforcing structure 8 that is pivotally supported by the supporting structure 7 by means of a hinge joint 9, which supporting structure 7 also anchors the inlet and outlet legs 2 and 3 of the conduit. It should be understood that, in an alternative design, the combination of the bowed or curved conduit 1 and the inlet and outlet legs 2 and 3 may be constructed of a single continuous conduit having a thin wall wherein the reinforcing structure 8 can be omitted. It should be noticed that the combination of the bowed or curved conduit 1 and its reinforcing structure 8 has a planar construction parallel to a reference plane defined by the center line of the conduit 1, and is symmetric about the center plane perpendicular to the reference plane and perpendicularly intersecting with the center section 10 of the bowed or curved conduit 1. A vibrator 11, which may be an electromagnet exerting a vibratory force onto the center section of the conduit in directions perpendicular to the reference plane as exemplified by the particular illustrative embodiment, or a combination of a crank shaft and connecting rod, or a cam and cam follower driven by a rotating machine in alternative designs, generates a pivotal vibration of the bowed or curved conduit 1 about the pivot axis 6 and produces a transverse reciprocating motion of the bowed or curved conduit 1 in directions substantially perpendicular to the reference. plane, wherein the magnitude of the transverse reciprocating motion of the bowed or curved conduit 1 increases from zero value at its two extremities including the flexible couplings, or pivotable or rotatable couplings 4 and 5 to a maximum value at the center section 10 in a symmetric distribution about the center plane. A first differential pressure sensor 12 detects the difference in the fluid pressure between two regions respectively adjacent to two diametrically opposite portions of the wall of the bowed or curved conduit 1 at a first section of the conduit 1 located on one side of the center plane, which two diametrically opposite portions of the conduit wall are respectively located on two opposite sides of a plane defined by the center line of the conduit 1. A second differential pressure sensor 13 detects the above-described differential pressure at a second section of the conduit 1 located on the other side of the center plane, wherein the first and second sections of the conduit 1, whereat the two differential pressures are tapped respectively, are located symmetrically about the center plane. A vibratory motion sensors 14 such as a piezo electric accelerometer or magnetic induction coil sensor disposed on the center plane and anchored to the reinforcing structure 8 or directly to the midsection of the bowed or curved conduit 1 measures the transverse reciprocating velocity or flexural vibration velocity of the conduit 1.

The two differential pressure sensors 12 and 13 respectively generate two alternating electrical signals representing the convective inertia force experienced by fluid respectively at the two sections of the conduit whereat the two are differential pressures tapper, respectively, while the vibratory motion sensor 14 generates a third alternating electrical signal representing the transverse reciprocating velocity of flexural vibration velocity of the conduit 1 at the midsection 10 of the conduit 1. In determining the mass flow rate and/or the fluid velocity by using one of equations (3) through (8) and/or equations (10) through (12), the phase angle difference $\Delta\phi$ is derived from the two alternating electrical signals respectively provided by the two differential pressure sensors 12 and 13 by using one of equations (13) through (15), or other mathematical formula, while the amplitude $\Delta P$ of the fluctuating fluid pressure is derived as a mean value of amplitudes of the two alternating electrical signals respectively provided by the two differential pressure sensors 12 and 13. Of course, the amplitude V or V(0) of the transverse reciprocating velocity or flexural vibration velocity of the conduit 1 is derived from the amplitude of the third alternating electrical signal provided by the vibratory motion sensor 14. The conversions from the amplitudes of the alternating electrical signals to the amplitudes of physical variables respectively represented by the alternating electrical variables are executed by the data analyzers 15, 16 and 17, respectively, which data analyzers supply the information required to determine the mass flow rate and/or the fluid velocity to a data processor 18, that actually determines the mass flow rate of fluid media and/or the fluid velocity by using an empirical counterpart of one of equations (3) through (8) and/or equations (10) through (12). The data processor 18 may also determine the density of fluid media as a ratio of the mass flow rate to the volume flow rate.

Unlike the conventional method of operating the existing versions of the Coriolis force flowmeter, wherein the conduit must be flexurally vibrated at one of its natural frequencies of the flexural vibration thereof, the conduit employed in the inertia force flowmeter of the present invention can be transversely reciprocated or flexurally vibrated at any desired frequencies, which may or may not be a natural frequency of the combined structure of the conduit 1 and the reinforcing structure 8. In order to save electrical energy supplied to the vibrator 11, it may be preferrable to transversely reciprocate or flexurally vibrate the bowed or curved conduit 1 about the pivot axis 6 at one of the natural frequencies of the pivotal vibration of the combined structure of the conduit 1 and the reinforcing structure 8 about the pivot axis 6, wherein the data processor 18 feeds the information on the natural frequency to the vibrator power supply 19 whereby the vibrator 11 exerts the vibratory force on the conduit 1 at the natural frequency. It is immediately recognized that, in an alternative design, the pivotal hinge joint 9 may be omitted and the planar member 20 of the reinforcing structure 8 may be directly secured to the supporting struture 7. It is also noticed that, when the reinforcing member 8 has a thin planar construction or the bowed or curved conduit 1 is a metallic tubing having a thin wall directly connected to the inlet and outlet legs 2 and 3 without those flexible or rotary couplings 4 and 5, the combined structure of the bowed or curved conduit 1 and the reinforcing structure 8 or the continuous conduit structure without the reinforcing structure 8 is provided with a torsional flexibility about an axis defined by the line of intersection between the reference plane and the center plane and, consequently, the pair of differential pressure sensors 12 and 13 can be replaced with a pair of vibratory motion sensors measuring the transverse reciprocating velocity or flexural vibration velocity of the conduit respectively at two different sections of the conduit 1 located symmetrically about the center plane, which two vibratory motion sensors respectively provide the alternating electrical signals providing the information on the phase angle difference, wherein the vibratory motion sensor 14 can be omitted as V or V(0) can be determined as a mean value of amplitudes of the two alternating electrical signals respectively provided by the two vibratory motion sensors now replacing the two differential pressure sensors 12 and 13. In a design providing an ultra-accurate inertia force mass flowmeter, the particular illustrative embodiment may include an ultra-accurate differential pressure sensor measuring $\Delta p$ at the center section of the bowed or curved conduit 1, while the two differential pressure sensors 12 and 3 are of inexpensive types; wherein the two alternating electrical signals respectively provided by the two differential pressure sensors 12 and 13 are used only to obtain the phase angle difference, $\Delta\phi$, while the third alternating electrical signal provided by the ultra-accurate differential pressure sensor is used to obtain $\Delta p$, whereby the mass flow rate of fluid media is determined by one of equations (4) through (8) and the fluid velocity is determined by using one of equations (10) through (12). It is readily recognized that, when the mass flow rate of fluid media and/or the velocity of the fluid media is determined by one of equations (6) through (8) and/or equation (12), the vibratory motion sensor 14 can be omitted from the particular illustrative embodiment as there is no need to measure V or V(0). The circular frequency $\omega$ of the transverse reciprocating motion or flexural vibration of the bowed or curved conduit 1 can be readily obtained by measuring the circular frequency of any one of the alternating electrical signals provided by the two differential pressure sensors and the vibratory motion sensor or sensors.

In FIG. 2, there is illustrated another embodiment of the inertia force flowmeter of the present invention comprising a single curved conduit, which embodiment has essentially the same construction as the inertia force flowmeter shown in FIG. 1 with the following exceptions: In this particular illustrative embodiment, a pair of rotary or pivotal couplings 21 and 22 connect the two extremities of bowed or curved conduit 23 respectively to the inlet and outlet legs 24 and 25 in a single in-line relationship coaxial to the center line of the hinge joint 26. The pair of differential pressure sensors 27 and 28 are now anchored to the supporting structure 29 instead of the reinforcing structure 30. The combination of the bowed or curved conduit 23 and the reinforcing structure 30 of a simple elongated geometry is disposed within a containment vessel 31, wherein structural extremities of the containment vessel 31 are welded to the inlet and outlet legs 24 and 25, and the supporting structure 29 in a leak-proof relationship. It should be recognized that this particular illustrative embodiment employs a rigid conduit 23 as the required transverse reciprocating motion of the conduit 23 is fully facilitated by the two rotary couplings 21 and 22 and, consequently this particular illustrative embodiment is especially suited for the construction of large diameter inertia force flowmeters. In an alternative design, one or both of the reinforcing structure 30 and the containment vessel 31 may be omitted.

In FIG. 3, there is illustrated a further embodiment of the inertia force flowmeter having elements essentially the same as the elements included in the embodiment shown in FIG. 1 with one exception, that is the straight continuous conduit 32 secured to a supporting structure 33 at the two opposite extremities of the conduit, which straight conduit 32 plays the same role as the bowed or curved conduit 1 included in the embodiment shown in FIG. 1. A vibrator 34 exerting a vibratory force onto the center section of the conduit 32 generates a flexural vibration of the conduit 32 in a symmetric mode about the center plane. A pair of differential pressure sensors 35 and 36 provide two alternating electrical signals providing the information on the phase angle difference as well as on the amplitude of the fluid pressure fluctuation. A vibratory motion sensor 37 provides the information on the amplitude of the flexural vibration of the conduit 32. Of course, the pair of differential pressure sensors 35 and 36 can be replaced by a pair of vibratory motion sensors. The electromagnetic shield plate 38 provides an electromagnetic shielding between the vibrator 34 and the motion sensor 37. This particular illustrative embodiment operates on the same principles as those described in conjunction with FIG. 1.

Figure 4:
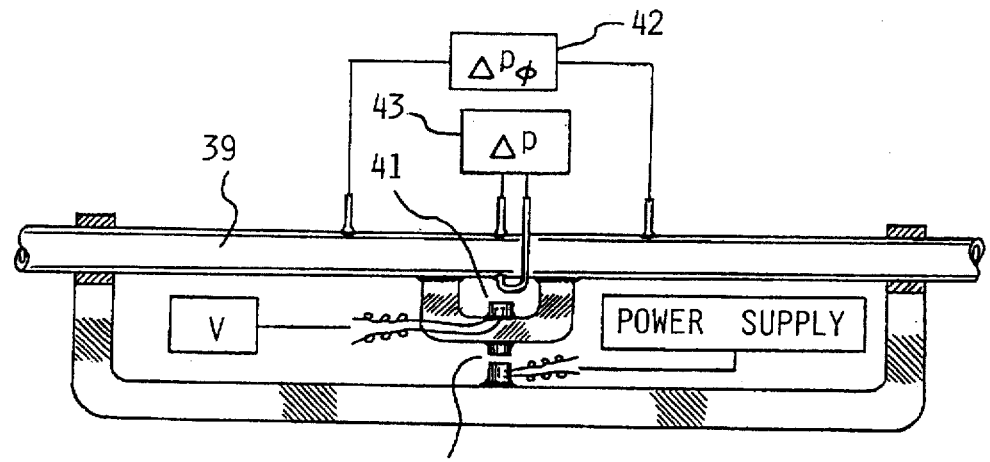
FIG. 4 illustrates yet a further embodiment of the inertia force flowmeter of the present invention comprising a single straight conduit.

In FIG. 4, there is illustrated yet a further embodiment of the inertia force flowmeter, that comprises a conduit 39 under a flexural vibration generated by a vibrator 40, which flexural vibration is detected at the center section of the conduit by a vibratory motion sensor 41 of the accelerometer type. A first differential pressure sensing system 42 detects the vibratory component of differential value of the pressure between two fluid pressures respectively existing at two sections of the conduit 39 located symmetrically about the center plane, while a second differential pressure sensing system 43 detects the differential value in the fluid pressure between two regions respectively adjacent to two diametrically opposite portions of the wall of the conduit 39 and respectively located on two opposite sides of the reference plane perpendicular to the direction of the vibratory motion of the conduit 39. The electrical signal generated by the differential pressure sensor 43 must be conditioned by a narrow band pass filter transmitting only an alternating electrical signal with frequencies equal or approximately equal to the frequency of the flexural vibration of the conduit 39. The phase angle difference between two convective inertia forces experienced by the fluid respectively at two sections of the conduit 39 located symmetrically about the center plane is determined as a ratio of the amplitude of a first alternating electrical signal generated by the first differential pressure sensing system 42 to the amplitude of a second alternating electrical signal generated by the second differential pressure sensing system 43. The amplitude of the second alternating electrical signal generated by the second differential pressure sensing system 43 provides $\Delta P\phi$ required in determining the mass flow rate of fluid media by using one of equations (3) through (8). Of course, the amplitude V or V(0) of reciprocating motion or flexural vibration of the conduit 39 is determined from an alternating electrical signal generated by the vibratory motion sensing system 41. This particular illustrative embodiment of the inertia force flowmeter determines the mass and/or volume flow rate by using an empirical equivalent of one of equations (3) through (8) and (11) through (13). It should be understood that the particular embodiment of the sensor systems respectively shown in FIGS. 1, 2, 3 and 4 interchangeable and, consequently, different illustrative embodiments shown in FIGS. 1 through 7 of the patent drawings may employ either one of the two sensor systems respectively shown and described in conjunction with FIG. 1 and 4.

Figure 5:
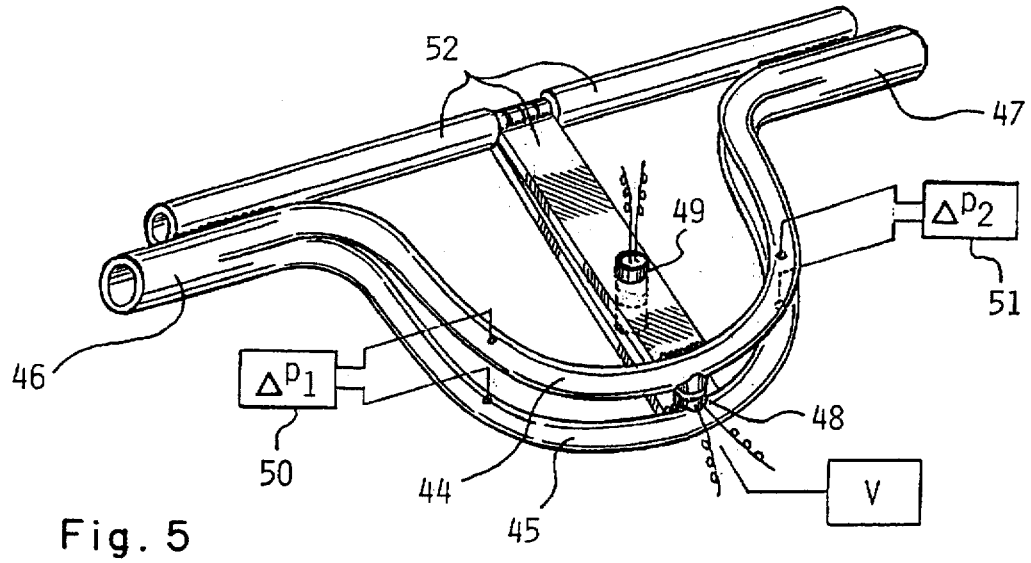
FIG. 5 illustrates an embodiment of the inertia force flowmeter of the present invention comprising a pair of curved conduits under a transverse reciprocating motion relative to one another.

In FIG. 5, there is illustrated an embodiment of the inertia force flowmeter of the present invention comprising a pair of curved conduits, which embodiment is a dual conduit version of the single conduit inertia force flowmeter shown in FIG. 1, that employs a pair of matched conduits 44 and 45 disposed in a superimposed relationship with a space therebetween, which pair of conduits 44 and 45 connects the common inlet leg 46 to the common outlet leg 47. A vibrator 48 exerts a vibratory force onto the center sections of the pair of conduits 44 and 45 in two opposite directions in an action-reaction relationship and generates a relative reciprocating motion or relative flexural vibration between the pair of bowed or curved conduits 44 and 45 in a direction perpendicular to a reference plane located intermediate two planes respectively defined by the center lines of the two bowed or curved conduits 44 and 45. A relative vibratory motion sensor 49 generates an alternating electrical signal representing the relative reciprocating motion between the two conduits 44 and 45 at the center plane. A pair of differential pressure sensors 50 and 51 disposed symmetrically about the center plane respectively generate two alternating electrical signals, wherein each of the pair of differential pressure sensors detects the difference between two fluid pressures existing in two fluid regions respectively adjacent to the farthest portion of the wall of the first bowed or curved conduit 44 from the reference plane located intermediate the pair of conduits 44 and 45, and to the nearest portion of the wall of the second bowed or curved conduit 45 to the reference plane. This dual conduit version of the inertia force flowmeter operates on the same methods as those described in conjunction with the single conduit version of the inertia force flowmeter shown in FIG. 1. It is readily recognized that the particular illustrative embodiment of the inertia force flowmeter functions without there reinforcing structure 52 supporting the pair of bowed or curved conduits 44 and 45 in a pivotable arrangement, when the two halves of the vibratory motion sensor 49 are relocated and directly affixed respectively to the center sections of the pair of conduits 44 and 45. It is also noticed that the two opposite extremities of each of the pair of bowed or curved conduits 44 and 45 may include the flexible or rotary, or pivotable couplings such as the flex-couplings 4 and 5 included in the embodiment shown in FIG. 1 or the rotary couplings 21 and 22 included in the embodiment shown in FIG. 2. In an alternative design, the pair of differential pressure sensors 50 and 51 may be modified in such a way that they detect the differential value between two fluid pressures commonly existing in one of the pair of conduits 44 and 45 in the same manner and described in conjunction with FIG. 1.

Figure 6:
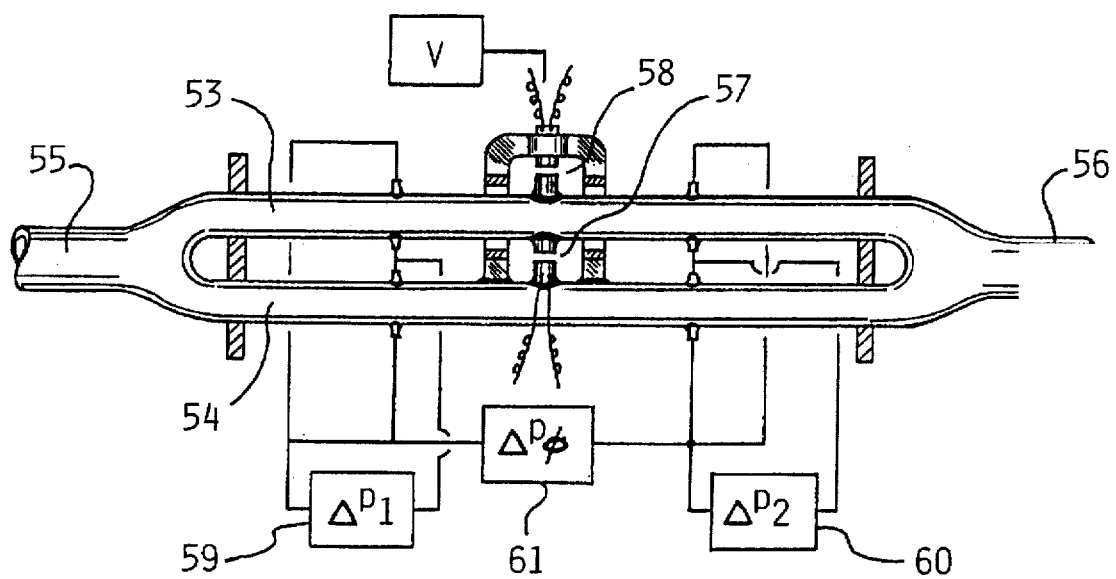
FIG. 6 illustrates another embodiment of the inertia force flowmeter of the present invention comprising a pair of straight conduits under a transverse reciprocating motion relative to one another.

In FIG. 6, there is illustrated another embodiment of the inertia force flowmeter comprising a pair of straight conduits, that is a dual conduit counter-part of the single conduit version of the inertia force flowmeter shown in FIG. 3 or 4. A pair of parallel conduits 53 and 54 connecting a common inlet leg 55 to a common outlet leg 56 are flexurally vibrated relative to one another by a vibrator 57. A relative vibration sensor 58 detects the velocity of the relative flexural vibration between the pair of conduits 53 and 54 at the center section of the combination thereof. Each of a pair of differential pressure sensing systems 59 and 60 detects mean value of the convective intertia forces experienced by the fluid media contained in the pair of conduits 53 and 54 at each of two different sections of the combination of the pair of conduits 53 and 54. In a combination employing the pair of differential pressure sensing systems 59 and 60 and the motion sensor 58, the particular illustrative embodiment of the inertia force flowmeter works on the same principles as those described in conjunction with FIGS. 1, 2, and 3. In place of the pair of differential pressure sensing systems 59 and 60, a single differential pressure sensing system 61 may be employed, wherein the single differential sensing system 61 detects a mean value of the difference in the convective inertia force experienced by fluid media between two different sections of each of the pair of conduits 53 and 54. In a combination employing the single differential pressure sensing system 61 and the motion sensor 58, the particular illustrative embodiment of the inertia force flowmeter works on the same principles as those described in conjunction with FIG. 4, wherein another differential pressure sensing system, such as the element 43 included in the embodiment shown in FIG. 4, may be included It should be understood that the sensor systems employed by the inertia force flowmeter shown in FIG. 5 and the two different sensor systems employed by the inertia force, flowmeter shown in FIG. 6 are interchangeable and, consequently, a dual conduit version of the inertia force flowmeter may employ any one of five different sensor systems respectively shown FIGS. 1, 4, 5 and 6.

Figure 7:
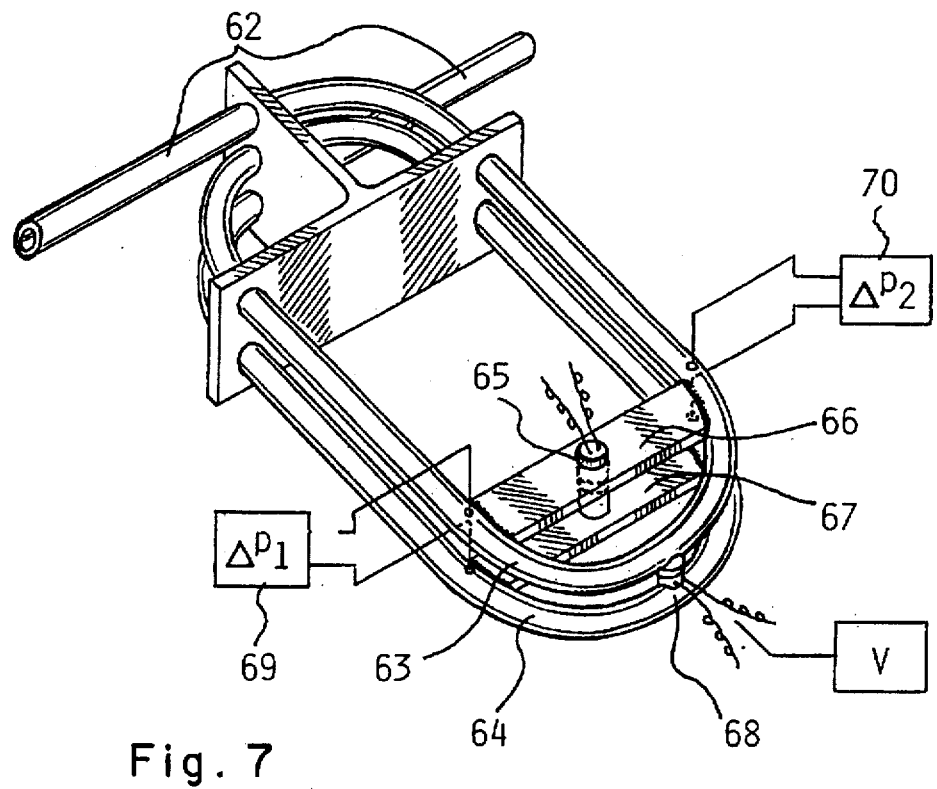
FIG. 7 illustrates yet another embodiment of the inertia force flowmeter of the present inevntion comprising a single conduit with double loop, where in the pair of loops of the conduit are under a transverse reciprocating motion relative to one another.

In FIG. 7, there is illustrated yet another embodiment of the inertia force flowmeter of the present invention, wherein a single continuous conduit 62 includes a pair of 360 degree loops 63 and 64 superimposed to one another with a space therebetween. An electromagnetic vibrator 65 with action and reaction halves respectively anchored to two bracing members 66 and 67 respectively affixed to the pair of conduit loops 63 and 64 generates a relative flexural vibration between the pair of conduit loops 63 and 64. The particular illustrative embodiment of the inertia force flowmeter comprises the same combinations of the sensor systems as that of the embodiment shown in FIG. 5, which sensor system comprises a relative motion sensor 68 and a pair of differential pressure sensors 69 and 70 assigned to two different sections of the combination of the pair of conduit loops 63 and 64 located symmetrically about the center plane of the conduit. Of course, the particular sensor system may be replaced with one of the two sensor system described in conjunction with FIG. 6. It is readily noticed that the pair of differential pressure sensors employed in the embodiments shown in FIGS. 5, 6 and 7 can be replaced with a pair of relative motion sensors such as the magnetic induction coil type comprising a permanent magnet and an induction coil respectively affixed to the pair of conduits or to the pair of conduit loops under the-relative vibration therebetween.

Figure 8:
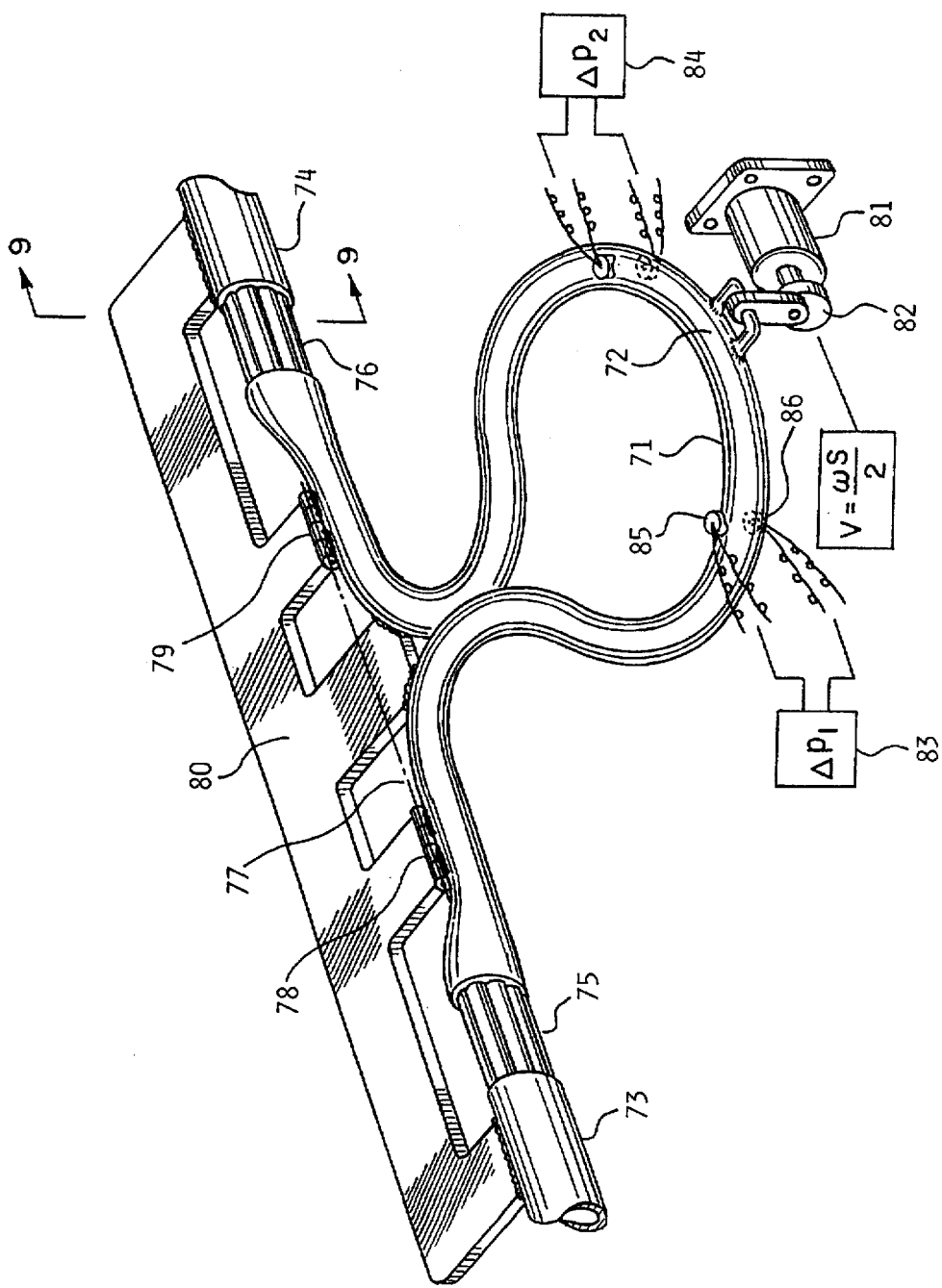
FIG. 8 illustrates a perspective view of an embodiment of the inertia force flowmeter of the present invention, that is particularly suited for the construction of the inertia force flowmeters of large diameters.

In FIG. 8, there is illustrated a perspective view of an embodiment of the inertia force flowmeter of the present invention, which embodiment is particularly suited for the construction of the inertia force flowmeters with flow passages having large diameters. This particular embodiment of the inertia force flowmeter comprises a rigid section of a curved or looped conduit 71 having a configuration symmetric about the midsection 72 thereof, which curved or looped section of conduit 71 connects an inlet leg 73 of a pipe line to an outlet leg 74 of the pipeline. The two opposite extremities of the curved or looped section of the conduit 71 are respectively connected to the inlet leg 73 and the outlet leg 74 by two torsionally flexible conduit couplings 75 and 76, each of which torsionally flexible conduit couplings comprises a plurality of substantially flexible tubings or tubings of low stiffness disposed about and parallel to the torsion axis 77 defined by the center line of two hinge joints 78 and 79 pivotally connecting the curved or looped section of the conduit 71 to a supporting structure 80 anchored to the inlet and outlet legs 73 and 74 of the pipe line. It should be noticed that the pair of torsionally flexible conduit couplings 75 and 76, and the pair of hinge joints 78 and 79 are disposed in an in-line relationship. A synchronous electric motor or other rotating machine 81 equipped with a rotating speed control device drives a cam mechanism 82 or a crank shaft with connecting rod, that produces a reciprocating pivotal motion of the curved or looped conduit 71 about the torsion axis 77. The fluid pressure gradient in the directions parallel to the directions of the reciprocating pivotal motion of the curved or looped conduit 71 is detected measured by two differential pressure sensors 83 and 84 respectively at two sections of the curved or looped conduit 71 located symmetrically about the midsection 72 of the curved or looped conduit 71. Each of the pair of differential pressure sensors 83 and 84 may comprise pair of absolute pressure sensors 85 and 86 disposed diametrically across the conduit cross section on a line parallel to the directions of the reciprocating pivotal motion of the curved or looped conduit 71 as exemplified by the particular illustrative embodiment 6 or may comprise a single differential pressure sensor of the type employed in the embodiment in an alternative design as exemplified by the embodiments shown in FIGS. 1 and 2. Of course, the vibrator comprising a combination of a rotating machine 81 and a cam or crank shaft mechanism 82 can be replaced by an electromagnetic vibrator in an alternative design.

When the reciprocating pivotal motion of the curved or looped conduit 71 is generated by a cam or crank shaft mechanism 82 driven by a rotating machine 81, the amplitude of the reciprocating velocity V(0) or V of the curved or looped conduit 71 is proportional to the circular frequency ω of the rotating speed of the rotating machine 81 times the stroke length S of the cam or crank shaft mechanism 82. Therefore, equations (4) and (5) can be written in the form $$M = K_6 \frac{\Delta P}{\omega} \tan\left(\frac{\Delta\phi}{2}\right). \tag{16}$$

When the rotating speed of the rotating machine 81 remains constant, equation (16) reduces to equation (7). It is readily recognized that equations (10) and (11) also reduce to the form $$U = C_4 \omega \tan\left(\frac{\Delta\phi}{2}\right). \tag{17}$$

When the rotating machine 81 has a constant rate of rotation, equation (17) reduces to equation (12). It should be understood that equations (16) and (17) respectively provide the mass flow rate and the fluid velocity, which are free of error arising from the drift of the dynamic property of the conduit structure and, consequently, provide the most desirable method for operating the inertia force flowmeters of the present invention as well as all of other Coriolis force flowmeter. It is readily recognized that the flexible conduit couplings respectively employed in the embodiments shown in FIGS. 1, 2 and 3 are interchangeable and that other types of the flexible conduit couplings can be used in place of the particular types shown in those illustrative embodiments. Of course, the torsionally flexible couplings 75 and 76 can be omitted in alternative designs, wherein the curved or looped conduit 71 is not totally rigid or the inlet and outlet legs 73 and 74 provide a torsional resiliency about the torsion axis 77. It is also readily recognized that the embodiment shown in FIG. 8 can be easily converted to the dual conduit type inertia force flowmeter exemplified by the embodiments shown in FIG. 5, which conversion can be immediately accomplished by adding another curved or looped conduit in addition to the curved or looped conduit 71 in a superimposing mirror image relationship therebetween, wherein the cam or crank shaft mechanism 82 now drives both of the curved or looped conduit in two opposite directions.

In determining the mass flow rate and/or fluid velocity by using equations (16) and/or (17), the phase angle difference Δφ is obtained from the phase angle difference between the two differential pressures respectively taken by the two differential pressure sensors 83 and 84, while the amplitude of the fluid pressure gradient ΔP is is obtained as the amplitude of the fluctuating differential pressure measured by one of the two differential pressure sensors 83 or 84, or as the mean value of two amplitudes of the fluctuating differential pressures respectively provided by the two differential pressure sensors 83 and 84. In an alternative design of the embodiment shown in FIG. 8, the two differential pressure sensors 83 and 84 can be respectively replaced by two vibratory motion sensors, which two vibratory motion sensors provide the phase angle difference Δφ, while a differential pressure sensor disposed at the midsection 72 of the curved or looped conduit is added in order to obtain the amplitude ΔP of the fluctuating fluid pressure gradient or the differential pressure.

Figure 9:
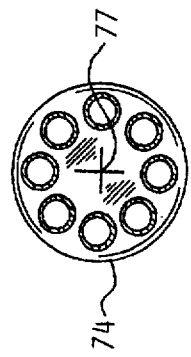
FIG. 9 illustrates a cross section of the torsionally flexible conduit coupling employed in the construction of the inertia force flowmeter shown in FIG. 8.

In FIG. 9 there is illustrated a cross section of the torsionally flexible conduit coupling 76 included in the embodiment shown in FIG. 8, which cross section taken along plane 9—9 as shown in FIG. 8 illustrates a plurality of flexible conduits or conduits of low stiffness disposed about and parallel to the torsion axis 77. This type of torsionally flexible conduit coupling provides an advantage over the mechanically rotatable or pivotable conduit couplings, as the torsionally flexible conduit coupling positively confines the fluid media therewithin and yet provides a torsional resiliency about the center line thereof.

While the principles of the present inventions have now been made clear by the illustrative embodiments shown and described there will be many modifications of the structures, arrangements, proportions, elements and materials, which are immediately obvious to those skilled in the art and particularity adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or privilege is claimed, are defined as follows:

1. An apparatus for measuring flow rate of fluid media moving through at least one conduit under a transverse reciprocating motion, comprising in combination:
   a) at least one conduit providing a flow passage;
   b) means for generating a transeverse reciprocating motion of the conduit in directions substantially perpendicular to a reference plane defined by the center line of the conduit in a mode wherein amplitude of the transverse reciprocating motion of the conduit has a minimum value at two opposite extremities respectively connected to an inlet leg and an outlet leg and has a maximum value at a center section of the conduit;

c) a first differential pressure transducer means for detecting a fluid pressure gradient in directions parallel to directions of the transverse reciprocating motion of the conduit at a first section of the conduit located on one side of the center section of the conduit, and generating a first alternating electrical signal representing the fluid pressure gradient existing at the first sedition of the conduits d) a second differential pressure transducer means for detecting a fluid pressure gradient in directions parallel to directions of the transverse reciprocating motion of the conduit at a second section of the conduit located on the other side of the center section of the conduit opposite to said one side, and generating a second alternating electrical signal representing the fluid pressure gradient existing at the second section of the conduit; and e) means for determining an electrical variable related to a phase difference between the first and second alternating electrical signals as a measure of mass flow rate of fluid media moving through the conduit.

2. An apparatus as defined in claim 1 including means for determining the mass flow rate of fluid media moving through the conduit as a function of the electrical variable related to the phase difference.

3. An apparatus as defined in claim 1 wherein the conduit is curved in a relationship wherein the center line of the conduit lies substantially on a reference plane approximately perpendicular to the directions of the transverse reciprocating motion of the conduit.

4. An apparatus as defined in claim 3 wherein the two opposite extremities of the conduit are respectively connected to the inlet and outlet legs by conduit coupling means allowing at least a minimal amount of pivotal movement of the conduit bout a pivotal axis lying on the reference plane.

5. An apparatus as defined in claim 1 wherein the conduit is substantially straight.

6. An apparatus as defined in claim 2 wherein said means for determining mass flow rate determines the mass flow rate of fluid media as a product of a parameter representing an amplitude of fluctuation in the fluid a pressure gradient and the function of the electrical variable related to the phase difference.

7. An apparatus as defined in claim 2 wherein said means for determining mass flow rate determines the mass flow rate of fluid media as a product of a ratio of a parameter representing an amplitude of fluctuation in the fluid pressure gradient to frequency of the transverse reciprocating motion of the conduit and the function of the electrical variable related to the phase difference.

8. An apparatus as defined in claim 2 wherein said means for determining mass flow rate determines the mass flow rate of fluid media as a product of a ratio of frequency of the transverse reciprocating motion of the conduit times a conduit parameter representing an amplitude of fluctuation in the fluid pressure gradient to square of amplitude of velocity in the transverse reciprocating motion of the conduit and the function of the electrical variable related to the phase difference.

9. An apparatus as defined in claim 1 including another conduit providing another flow passage, wherein said at least one conduit and said another conduit have substantially identical construction and are disposed in a superimposing relationship with a space therebetween in a mirror image to one another with respect to a reference plane located therebetween; and said means for generating a transverse reciprocating motion generates a relative transverse reciprocating motion between said at least one conduit and said another conduit, said first and said second differential pressure transducer means detect the fluid pressure gradient existing in the fluid media contained within at least one of said at least one conduit and said another conduit, and said at least one conduit and said another conduit connect the inlet leg and the outlet leg to one another in one of the parallel connection and series connection.

10. An apparatus as defined in claim 9 including means for determining mass flow rate of fluid media moving through it least one of said at least one conduit and said another conduit as a function of the electrical variable related to the phase difference.

11. An apparatus as defined in claim 9 wherein each of said least one conduit and said another conduit is curved in a relationship wherein the center line of each conduit lies on a plane substantially parallel to a reference plane located intermediate said at least one conduit and said another conduit.

12. An apparatus as defined in claim 11 wherein the two opposite extremities of each of said at least one conduit and another conduit are respectively connected to the inlet leg and the outlet leg of each conduit by conduit coupling means allowing at least a minimal amount of pivotal movement of each conduit about a pivotal axis of each conduit parallel to the reference plane.

13. An apparatus as defined in claim 9 wherein each of said at least one conduct and said another conduit is substantially straight.

14. An apparatus as defined in claim 10 wherein said means for determining mass flow rate determines the mass flow rate of fluid media as a product of a parameter representing an amplitude of fluctuation in the fluid pressure gradient and the function of the electrical variable related to the phase difference.

15. An apparatus as defined in claim 10 wherein said means for determining mass flow rate determines the mass flow rate of fluid media as a product of a ratio of a parameter representing an amplitude of fluctuation in the fluid pressure gradient to frequency of the relative transverse reciprocating motion between said at least one conduit and said another conduit and the function of the electrical variable related to the phase difference.

16. An apparatus as defined in claim 10 wherein said means for determining mass flow rate determines the mass flow rate of fluid media as a product of a ratio of frequency of the relative transverse, reciprocating motion between said at least one conduit and said another conduit times a parameter representing an amplitude of fluctuation in the fluid pressure gradient to square of amplitude of velocity in the relative transverse reciprocating motion between said at least one conduit and said another conduit and the function of the electrical variable related to the phase difference.

17. An apparatus for measuring flow rate of media moving through least one conduit under a transverse reciprocating motion, comprising in combination:

a) at least one conduit providing a flow passage;

b) means for generating a transverse reciprocating motion of the conduit in directions substantially perpendicular to a reference plane defined by the center line of the conduit in a mode wherein amplitude of the transverse reciprocating motion of the conduit has a minimum value at two opposite extremities respectively connected to an inlet leg and an outlet leg and has a maximum value at a center section of the conduit;

c) a first vibratory motion transducer means for detecting the transverse reciprocating motion of the conduit at a first section of the conduit located on one side of the center section of the conduit, and generating a first alternating electrical signal representing the transverse reciprocating motion of the conduit occurring at the first section of the conduit;

d) a second vibratory motion transducer means for detecting the transverse reciprocating motion of the conduit at a second section of the conduit located on the other side of the center section of the conduit opposite to said one side, and generating a second alternating electrical signal representing the transverse reciprocating motion of the conduit occurring at the second section of the conduit;

e) means for obtaining a phase difference between the first and second alternating electrical signals; and f) means for measuring amplitude of fluctuation in fluid pressure gradient in directions parallel to directions of the transverse reciprocating motion of the conduit at a section of the conduit; and g) means for determining mass flow rate of fluid media moving through the conduit as a product of a parameter representing the amplitude of fluctuation in fluid pressure gradient and a function of an electrical variable related to the phase difference between the first and second alternating electrical signals.

18. An apparatus as defined in claim 17 wherein said means for determining mass flow rate determines the mass flow rate of fluid media as a product of a ratio of the parameter representing the amplitude of fluctuation in fluid pressure gradient to frequency of the transverse reciprocating motion of the conduit arid the function of the electrical variable related to the phase difference.

19. An apparatus as defined in claim 17 including another conduit providing another flow passage, wherein said at least one conduit and said another conduit have substantially identical construction and are disposed in a superimposing relationship with a space therebetween in a mirror image to one another with respect to a reference plane located therebetween; and said means for generating the transverse reciprocating motion generates a relative transverse reciprocating motion between said at least one conduit and said another conduit, said first and second vibratory motion transducer means detect the relative transverse reciprocating motion between said at least one conduit and said another conduit, and said at least one conduit and said another conduit connect the inlet leg and the outlet leg to one another in one of the parallel and series connection.

20. An apparatus as defined in claim 19 wherein said means for determining mass flow rate determines the mass flow rate of fluid media moving through at least one of said at least one conduit and said another conduit as a product of a ratio the parameter representing the amplitude of fluctuation in fluid pressure gradient to frequency of the relative transverse reciprocating motion between said at least one conduit and another conduit and the function of the electrical variable related to the phase difference.

* * * * *